US012592473B2

(12) United States Patent (10) Patent No.: US 12,592,473 B2
Morita (45) Date of Patent: Mar. 31, 2026

(54) COMMUNICATION APPARATUS AND COMMUNICATION SYSTEM

(71) Applicant: CANON KABUSHIKI KAISHA, Tokyo (JP)

(72) Inventor: Jun Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 506 days.

(21) Appl. No.: 18/062,406

(22) Filed: Dec. 6, 2022

(65) Prior Publication Data

US 2023/0179259 A1 Jun. 8, 2023

(30) Foreign Application Priority Data

Dec. 8, 2021 (JP) ................................. 2021-199346

(51) Int. Cl.
*H01Q 1/22* (2006.01)
*H04B 5/22* (2024.01)
*H04B 5/24* (2024.01)

(52) U.S. Cl.
CPC ............. *H01Q 1/2283* (2013.01); *H04B 5/22* (2024.01); *H04B 5/24* (2024.01)

(58) Field of Classification Search
CPC ................................... H04B 5/24; H04B 5/72
See application file for complete search history.

(56) References Cited

U.S. PATENT DOCUMENTS

2007/0037516 A1* 2/2007 Sawai .............. G06K 19/07786
455/41.1
2013/0324044 A1* 12/2013 Kuroda .................... H04B 5/28
455/41.1
2015/0207541 A1* 7/2015 Kuroda .................. H04B 5/266
455/41.1
2018/0366425 A1* 12/2018 Kondo ............. H01L 23/49551

FOREIGN PATENT DOCUMENTS

JP 2017118476 A 6/2017

* cited by examiner

*Primary Examiner* — Yuwen Pan
(74) *Attorney, Agent, or Firm* — Canon U.S.A., Inc., IP Division

(57) ABSTRACT

A communication apparatus configured to perform wireless communication includes a first dielectric body, and a second coupler provided on the first dielectric body and configured to be coupled to a first coupler included in another communication apparatus by electric field coupling or magnetic field coupling, wherein the second coupler includes a first conductor and a second conductor, and wherein the first dielectric body is provided with a hole, a recessed part, or a second dielectric body with a lower relative dielectric constant than a relative dielectric constant of the first dielectric body, in at least a portion of a region that is projected onto a region between the first conductor and the second conductor.

12 Claims, 10 Drawing Sheets

INPUT SIGNAL Vi

RECEIVED SIGNAL Vr

OUTPUT SIGNAL Vo

0 V

0 V

0 V

INPUT SIGNAL Vi

RECEIVED SIGNAL Vr

OUTPUT SIGNAL Vo

0 V

0 V

0 V

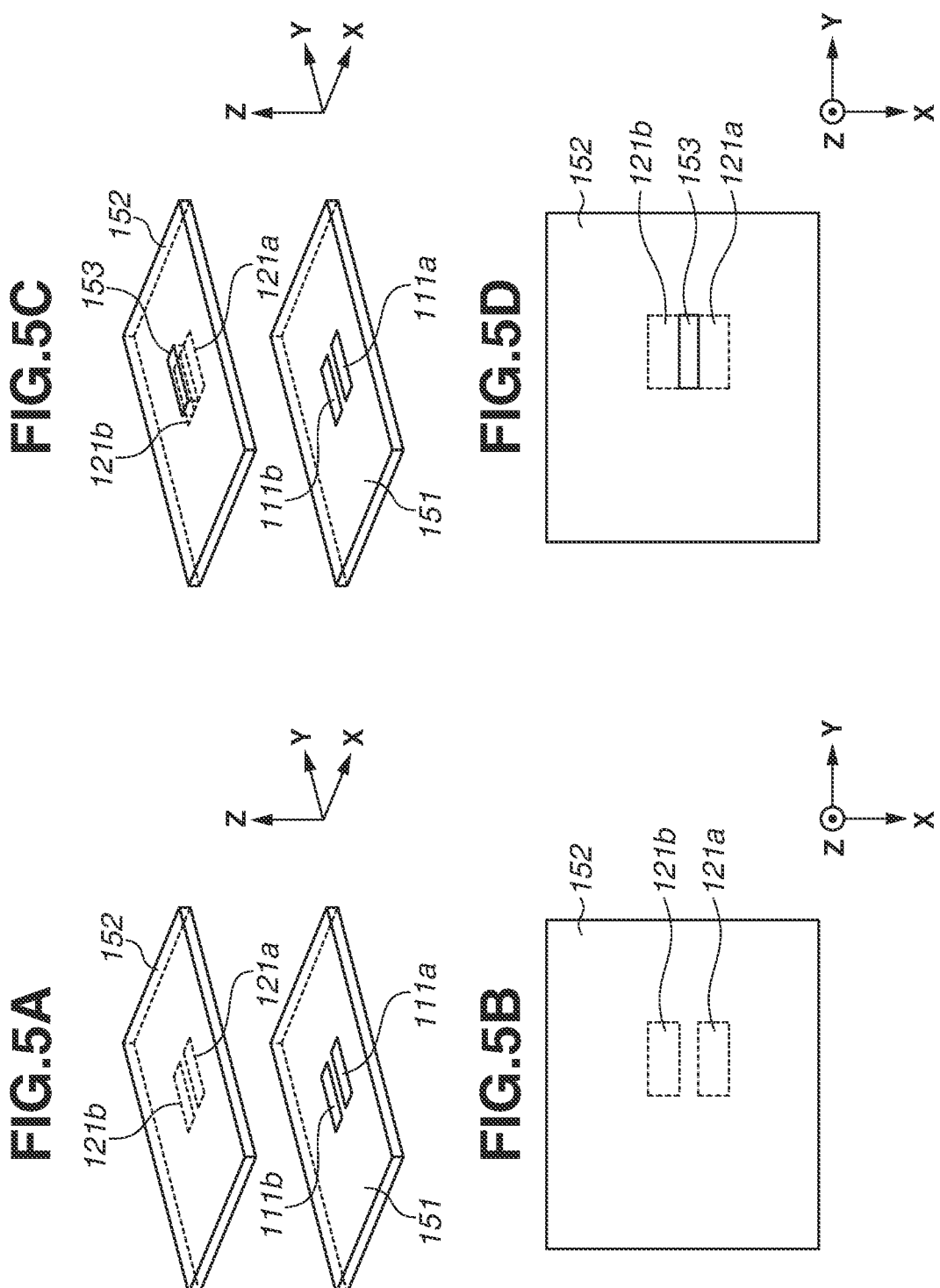

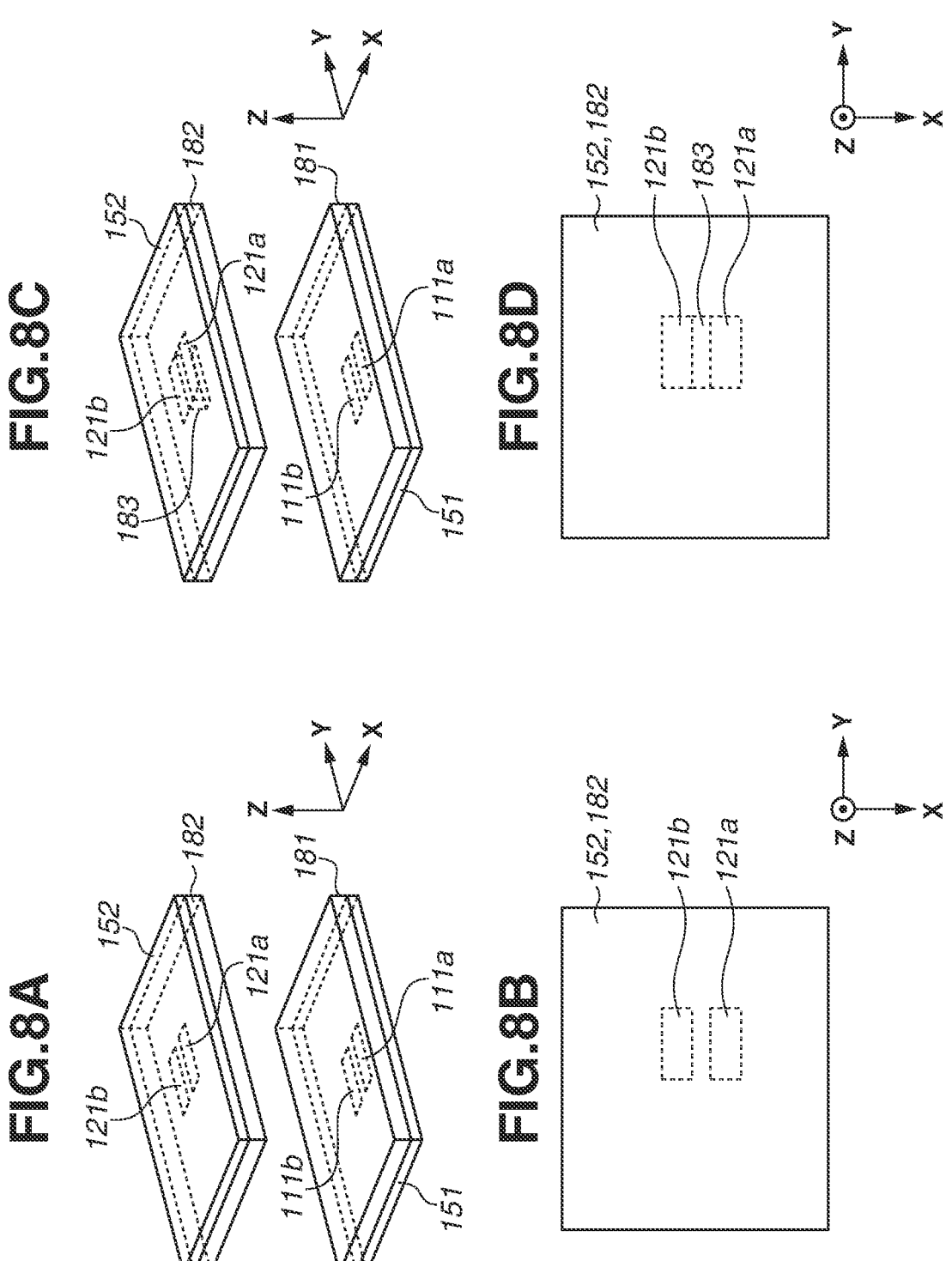

COMMUNICATION APPARATUS AND COMMUNICATION SYSTEM

BACKGROUND

Field of the Disclosure

The present disclosure relates to a communication apparatus and a communication system.

Description of the Related Art

As a method for connecting communication interfaces between electronic circuit boards or modules, a connector or a harness is used. However, if the connection using the connector or harness can be changed to wireless connection, it is advantageous in that the manufacturing process can be simplified.

Japanese Patent Application Laid—Open No. 2017-118476 discusses a wireless communication system structured to transmit data in a non-contact manner using electromagnetic field coupling in which a distance between couplers is shortened to improve communication performance.

In recent years, amounts of intra-device and inter-device communication data have increased, and there is a demand for provision of high-speed communication in wireless communication systems. However, in the case of inter-device communication, for example, a coupler is generally arranged in a product housing, and housings have dimensional tolerances. Thus, the distance between couplers may be long depending on devices, which makes it difficult to increase received signals.

In intra-device communication as well, if the couplers are arranged in proximity to each other, there is a risk that the couplers may come into contact with each other due to a tolerance in circuit board thickness. Accordingly, it is necessary to arrange the couplers with a significant distance therebetween. As a result, sufficient magnitudes of received signals may not be secured.

SUMMARY

The present disclosure is directed to a technique for increasing the amplitude of a received signal.

According to an aspect of the present disclosure, a communication apparatus configured to perform wireless communication includes a first dielectric body, and a second coupler provided on the first dielectric body and configured to be coupled to a first coupler included in another communication apparatus by electric field coupling or magnetic field coupling, wherein the second coupler includes a first conductor and a second conductor, and wherein the first dielectric body is provided with a hole, a recessed part, or a second dielectric body with a lower relative dielectric constant than a relative dielectric constant of the first dielectric body, in at least a portion of a region that is projected onto a region between the first conductor and the second conductor.

Further features of the present disclosure will become apparent from the following description of exemplary embodiments with reference to the attached drawings.

BRIEF DESCRIPTION OF THE DRAWINGS

FIGS. 5A, 5B, 5C, and 5D are diagrams illustrating configuration examples of couplers, in accordance with one or more embodiment of the subject disclosure.

FIGS. 8A, 8B, 8C, and 8D are diagrams illustrating configuration examples of couplers, in accordance with one or more embodiment of the subject disclosure.

DESCRIPTION OF THE EMBODIMENTS

Figure 1:
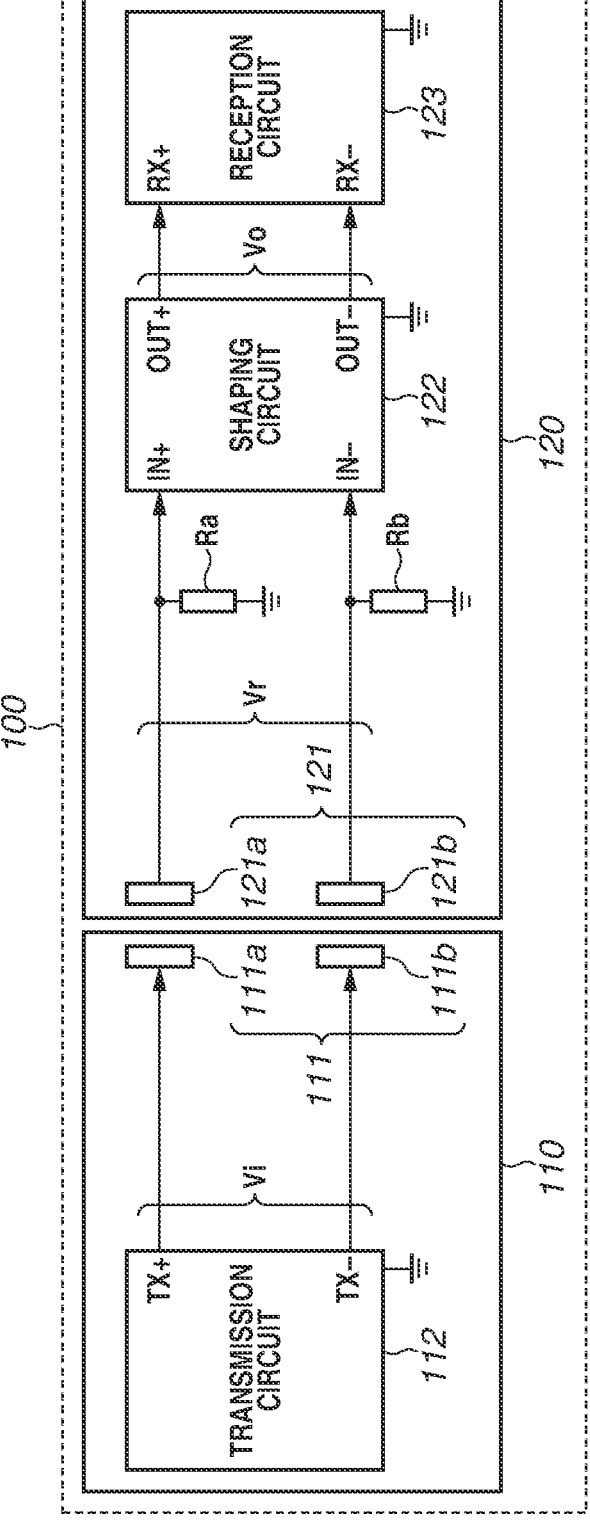
FIG. 1 is a diagram illustrating a configuration example of a wireless communication system, in accordance with one or more embodiment of the subject disclosure.

FIG. 1 is a diagram illustrating a configuration example of a wireless communication system 100 according to a first exemplary embodiment. The wireless communication system 100 includes wireless communication modules 110 and 120, and communication between the wireless communication modules 110 and 120 will be performed wirelessly.

The wireless communication module 110 includes a coupler 111 and a transmission circuit 112. The coupler 111 includes two separate conductors 111a and 111b. The transmission circuit 112 outputs differential signals in opposite phases from output terminals TX+ and TX− to the conductors 111a and 111b, respectively. The output terminal TX+ of the transmission circuit 112 outputs a positive signal of the differential signals to the conductor 111a. The output terminal TX− of the transmission circuit 112 outputs a negative signal of the differential signals, which is opposite in phase to the positive signal, to the conductor 111b. A difference between the positive signal and the negative signal output from the transmission circuit 112 is indicated as Vi.

The wireless communication module 120 includes a coupler 121, a shaping circuit 122, a reception circuit 123, and termination resistors Ra and Rb. The coupler 121 has two separate conductors 121a and 121b.

The coupler 111 of the wireless communication module 110 and the coupler 121 of the wireless communication module 120 are arranged close to each other and facing each other so that these couplers are coupled by electromagnetic field coupling. The conductor 111a and the conductor 121a are arranged close to each other and facing each other. The conductor 111b and the conductor 121b are arranged close to each other and facing each other.

The wireless communication system 100 uses the electromagnetic field coupling between the couplers 111 and 121 to implement wireless communication of differential signals between the wireless communication module 110 and the wireless communication module 120. Specifically, the transmission circuit 112 wirelessly transmits differential signals to the shaping circuit 122 via the electromagnetic field coupling between the couplers 111 and 121.

The termination resistor Ra is connected to an input terminal IN+ of the shaping circuit 122. The termination resistor Rb is connected to an input terminal IN– of the shaping circuit 122. The input terminals IN+ and IN– of the shaping circuit 122 wirelessly receive differential signals from the output terminals TX+ and TX– of the transmission circuit 112 via the electromagnetic field coupling between the couplers 111 and 121. The input terminal IN+ of the shaping circuit 122 wirelessly receives a positive signal from the output terminal TX+ of the transmission circuit 112 via the electromagnetic field coupling between the conductors 111a and 121a. The input terminal IN– of the shaping circuit 122 wirelessly receives a negative signal opposite in phase to the positive signal from the output terminal TX– of the transmission circuit 112 via the electromagnetic field coupling between the conductors 111b and 121b. A difference between the positive signal and the negative signal input to the shaping circuit 122 is indicated as Vr.

The shaping circuit 122 shapes the differential signals received by the input terminals IN+ and IN–, and outputs the differential signals from the output terminals OUT+ and OUT–. The shaping circuit 122 shapes the signal received by the input terminal IN+ and outputs the positive signal from the output terminal OUT+. The shaping circuit 122 shapes the signal received by the input terminal IN–, and outputs the negative signal opposite in phase to the positive signal from the output terminal OUT–. A difference between the positive signal and the negative signal output by the shaping circuit 122 is indicated as Vo. The signal Vo is a signal obtained after restoration of the signal Vi.

Input terminals RX+ and RX– of the reception circuit 123 receive the differential signals output from the output terminals OUT+ and OUT– of the shaping circuit 122. The reception circuit 123 performs a reception process on the differential signals input to the input terminals RX+ and RX–.

Figure 2A:
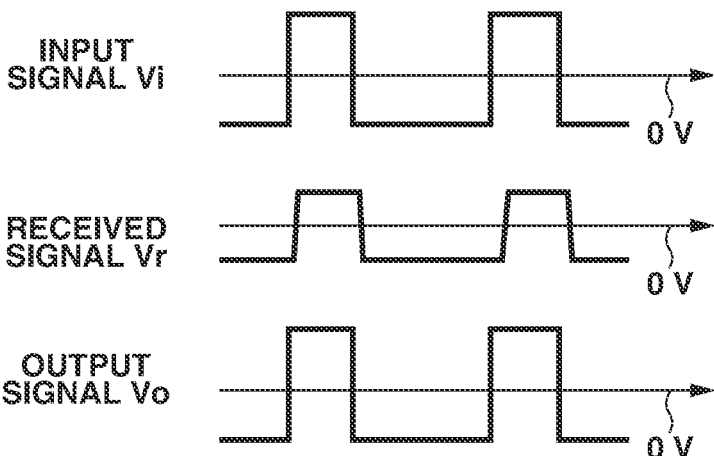
FIGS. 2A and 2B are waveform diagrams illustrating examples of signals, in accordance with one or more embodiment of the subject disclosure.

FIG. 2A is a diagram illustrating examples of the input signal Vi, the received signal Vr, and the output signal Vo under ideal environments.

The termination resistors Ra and Rb illustrated in FIG. 1 have a high impedance of 22 kΩ or the like, for example. Accordingly, the impedances of the termination resistors Ra and Rb are larger than the impedances of capacitance components generated by the coupling between the couplers 111 and 121, even in a low-frequency region. As a result, components of the low-frequency band of the input signal Vi are transmitted as the received signal Vr to the shaping circuit 122. The received signal Vr is transmitted while maintaining rectangular shapes indicating "1" and "0" as illustrated in FIG. 2A. The input signal Vi is a rectangular wave of negative voltage and positive voltage. The received signal Vr is a rectangular wave of negative voltage and positive voltage. The shaping circuit 122 outputs, for example, the output signal Vo of negative voltage in a period during which the received signal Vr is lower than 0 V and outputs the output signal Vo of positive voltage (high level) in a period during which the received signal Vr is 0 V or higher. The output signal Vo is a signal equivalent to the input signal Vi.

Figure 2B:
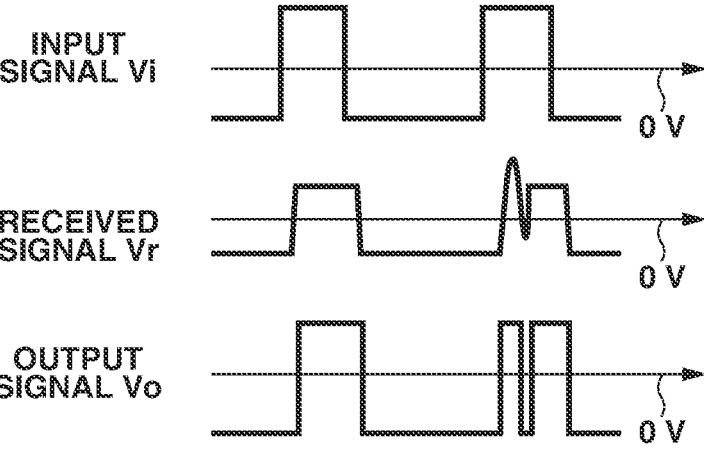

FIG. 2B is a diagram illustrating examples of the input signal Vi, the received signal Vr, and the output signal Vo in a case where external noise is mixed into the coupler 111 or 121. The input signal Vi in FIG. 2B is the same as the input signal Vi in FIG. 2A. However, if external noise is mixed into the coupler 111 or 121, the noise may be mixed into the received signal Vr in FIG. 2B. The shaping circuit 122 outputs, for example, the output signal Vo of negative voltage in a period during which the received signal Vr is lower than 0 V and outputs the output signal Vo of positive voltage (high level) in a period during which the received signal Vr is 0 V or higher. If the noise is mixed into the received signal Vr, the output signal Vo becomes a signal different from the input signal Vi to cause a communication error.

Thus, in order to prevent an occurrence of a communication error even if external noise is mixed into the coupler 111 or 121, it is necessary to increase the level of the received signal Vr to be higher than the noise. Thus, in the present exemplary embodiment, weakening the coupling between the conductor 121a and the conductor 121b that receive the differential signals is effective in increasing the level of the received signal Vr, as described below.

Figure 3:
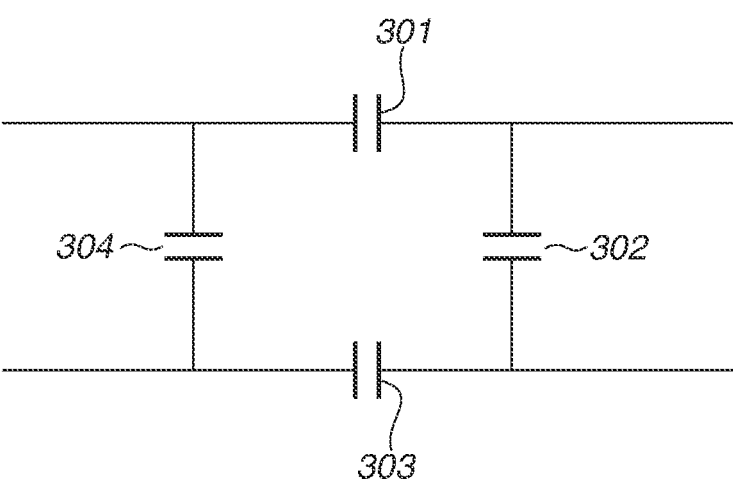
FIG. 3 is an equivalent circuit diagram of couplers, in accordance with one or more embodiment of the subject disclosure.

FIG. 3 is a diagram illustrating an equivalent circuit of the coupler 111 and the coupler 121. A capacitance 301 refers to a coupling capacitance between the conductor 111a and the conductor 121a. A capacitance 302 refers to a coupling capacitance between the conductor 121a and the conductor 121b. A capacitance 303 refers to a coupling capacitance between the conductor 111b and the conductor 121b. A capacitance 304 indicates a coupling capacitance between the conductor 111a and the conductor 111b. FIG. 3 illustrates the equivalent circuit of only main electric field couplings among the electromagnetic field couplings between the couplers 111 and 121.

Figure 4A:
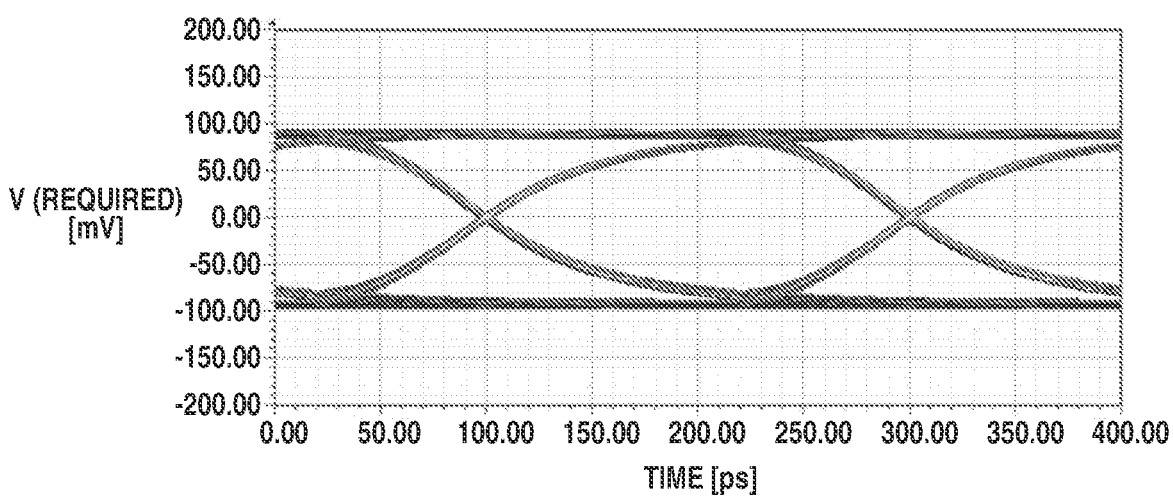
FIGS. 4A and 4B are diagrams illustrating simulation results of eye patterns of received signals, in accordance with one or more embodiment of the subject disclosure.
Figure 4B:
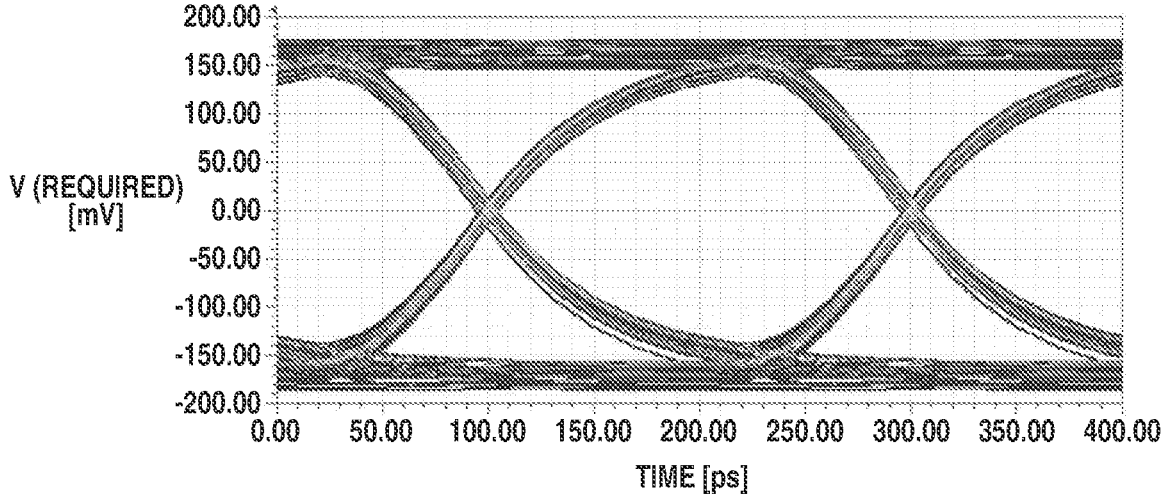

FIG. 4A is a diagram illustrating a simulation result of an eye pattern of the received signal Vr in a case where the coupling capacitance 302 is large, and a capacitance value of the coupling capacitance 302 is 0.5 pF. FIG. 4B is a diagram illustrating a simulation result of an eye pattern of the received signal Vr in a case where the coupling capacitance 302 is small, and the capacitance value of the coupling capacitance 302 is 0.25 pF. The capacitance values of the coupling capacitances 301, 303, and 304 illustrated in FIG. 4A are the same as the capacitance values of the coupling capacitances 301, 303, and 304 illustrated in FIG. 4B, respectively. The amplitude of the received signal Vr in the case where the coupling capacitance 302 in FIG. 4B is small is larger than the amplitude of the received signal Vr in the case where the coupling capacitance 302 in FIG. 4A is large. The input signal Vi is a signal of 5 gigabits per second (Gbps) and approximately 1 volt peak-to-peak (Vpp).

FIG. 5A is a perspective view of a structural example of dielectric bodies 151 and 152 and conductors 111a, 111b, 121a, and 121b according to a comparative example. FIG. 5B is a plan view of the dielectric body 152 and the conductors 121a and 121b in FIG. 5A. The conductor 111a and the conductor 111b are provided on the dielectric body 151 such as a Flame Retardant Type 4 (FR4) circuit board. The conductor 121a and the conductor 121b are provided on the dielectric body 152 such as a FR4 circuit board.

FIG. 5C is a perspective view of a structural example of the dielectric bodies 151 and 152, the conductors 111a, 111b, 121a, and 121b, and a perforated part 153 according to the first exemplary embodiment. FIG. 5D is a plan view of the dielectric body 152, the conductors 121a and 121b, and the perforated part 153 in FIG. 5C. The conductors 111a and 111b are provided on the dielectric body 151 such as an FR4 circuit board. The conductors 121a and 121b are provided on the dielectric body 152 such as an FR4 circuit board. In the dielectric body 152, the perforated part 153 is provided in a region that is projected onto a region between the conductor 121*a* and the conductor 121*b*. The perforated part 153 is a through hole of the dielectric body 152.

The coupling capacitance between the conductor 121*a* and the conductor 121*b* in FIGS. 5C and 5D is smaller than the coupling capacitance between the conductor 121*a* and the conductor 121*b* in FIGS. 5A and 5B. As described above, the amplitude of the received signal Vr in the case where the coupling capacitance in FIG. 4B is small is larger than the amplitude of the received signal Vr in the case where the coupling capacitance in FIG. 4A is large. Thus, the received signal Vr of the conductors 121*a* and 121*b* in FIGS. 5C and 5D is larger in amplitude than the received signal Vr of the conductors 121*a* and 121*b* in FIGS. 5A and 5B.

Figure 6A:
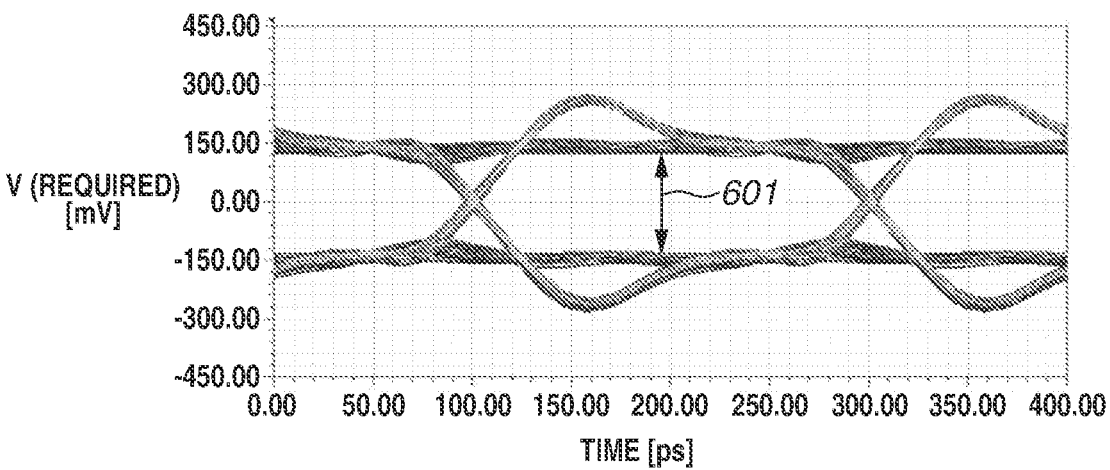
FIGS. 6A and 6B are diagrams illustrating simulation results of eye patterns of received signals, in accordance with one or more embodiment of the subject disclosure.

FIG. 6A is a diagram illustrating a simulation result of an eye pattern of the received signal Vr of the conductors 121*a* and 121*b* in FIGS. 5A and 5B. An amplitude value 601 of the received signal Vr is 251 millivolts peak-to-peak (mVpp).

Figure 6B:
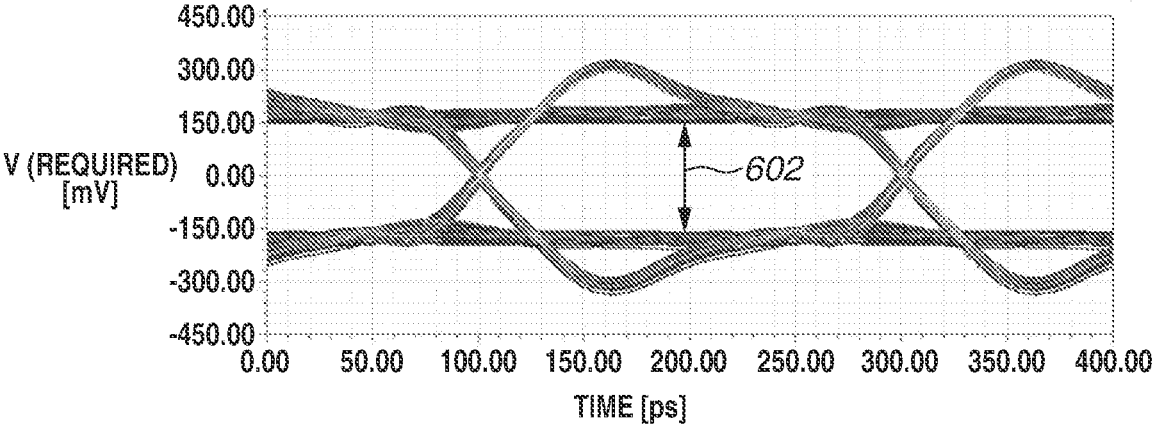

FIG. 6B is a diagram illustrating a simulation result of an eye pattern of the received signal Vr of the conductors 121*a* and 121*b* in FIGS. 5C and 5D. An amplitude value 602 of the received signal Vr is 307 mVpp.

It can be seen that the amplitude value 602 in FIG. 6B is about 1.22 times the amplitude value 601 in FIG. 6A. The input signal Vi is a signal of 5 Gbps and approximately 1 Vpp.

The eye pattern in FIGS. 6A and 6B and the eye pattern in FIGS. 4A and 4B are different in shape because FIGS. 4A and 4B illustrate the results of simulations using an ideal capacitance that includes no parasitic inductance and parasitic resistance of a coupler structure.

As described above, in the present exemplary embodiment, providing the perforated part 153 in the region of the dielectric body 152 that is projected onto the region between the conductor 121*a* and the conductor 121*b* makes it possible to reduce the coupling capacitance between the conductor 121*a* and the conductor 121*b*. Accordingly, the wireless communication system 100 can increase the amplitude of the received signal Vr and reduce communication errors caused by noise.

FIGS. 5C and 5D illustrate a case where the length of the perforated part 153 is identical to the lengths of the long sides of the conductors 121*a* and 121*b*, but the present disclosure is not limited to this. The length of the perforated part 153 may be shorter or longer than the lengths of the long sides of the conductors 121*a* and 121*b*.

Figure 7:
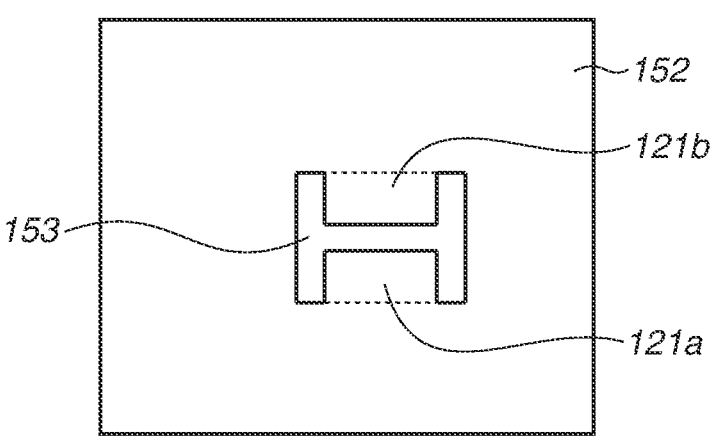
FIG. 7 is a diagram illustrating a configuration example of a coupler, in accordance with one or more embodiment of the subject disclosure.

FIGS. 5C and 5D illustrate a case where the perforated part 153 is provided along the longer side of the conductors 121*a* and 121*b*, but the present disclosure is not limited to this. As illustrated in FIG. 7, the perforated part 153 may be provided along the long sides and the short sides of the conductors 121*a* and 121*b*.

FIGS. 5C and 5D illustrate a case where the perforated part 153 is provided in the region of the dielectric body 152 that is projected onto the region between the conductor 121*a* and the conductor 121*b*. Instead of the perforated part 153, a recessed part may be provided. The thickness of the recessed part is smaller than the thickness of the dielectric body 152. More specifically, in the dielectric body 152, the region of the dielectric body 152 that is projected onto the region between the conductor 121*a* and the conductor 121*b* is smaller than the thickness of the other region.

FIGS. 5C and 5D illustrate a case where the perforated part 153 is provided in the region that is projected onto the region between the conductor 121*a* and the conductor 121*b*. Instead of the perforated part 153, a dielectric body with a lower relative dielectric constant than a relative dielectric constant of the dielectric body 152 may be provided.

In the present exemplary embodiment, the coupling capacitance between the conductor 121*a* and the conductor 121*b* in the wireless communication module 120 is reduced. However, reducing the coupling capacitance between the conductor 111*a* and the conductor 111*b* in the wireless communication module 110 also has the effect of increasing the amplitude of the received signal Vr. Therefore, the perforated part 153 may be provided in the region of the dielectric body 151 that is projected onto the region between the conductor 111*a* and the conductor 111*b*.

As described above, the wireless communication system 100 includes the wireless communication modules 110 and 120. The wireless communication modules 110 and 120 are wireless communication apparatuses that perform wireless communication. The wireless communication module 110 includes the coupler 111 and the dielectric body 151.

The coupler 111 includes the conductor 111*a* and the conductor 111*b* and is provided on the dielectric body 151. The dielectric body 151 is a circuit board, for example.

The wireless communication module 120 includes the coupler 121 and the dielectric body 152. The coupler 121 includes the conductor 121*a* and the conductor 121*b*, and is provided on the dielectric body 152. The coupler 121 is coupled to the coupler 111 by electric field coupling or magnetic field coupling. The dielectric body 152 is a circuit board, for example.

The dielectric body 152 has a hole (the perforated part 153), a recessed part, or a dielectric body with a lower relative dielectric constant than the relative dielectric constant of the dielectric body 152, in at least a portion of the region that is projected onto the region between the conductor 121*a* and the conductor 121*b*.

In the above-described recessed part, the thickness of at least a portion of the region of the dielectric body 152 that is projected onto the region between the conductor 121*a* and the conductor 121*b* is smaller than the thickness of the region of the dielectric body 152 that is projected onto the region between the conductor 121*a* and the conductor 121*b*.

The conductor 111*a* and the conductor 111*b* wirelessly communicate differential signals, and the conductor 121*a* and the conductor 121*b* wirelessly communicate differential signals. The coupler 111 and the coupler 121 may wirelessly communicate single signals.

The coupler 111 is a transmission coupler. The transmission circuit 112 outputs the input signal (transmission signal) Vi to the coupler 111. The coupler 121 is a reception coupler. The shaping circuit 122 is connected to the conductor 121*a* and the conductor 121*b*. The termination resistors Ra and Rb are connected to the input terminals IN+ and IN− of the shaping circuit 122, respectively, and have a resistance value (for example, 22 kΩ) with which the received signal Vr of the coupler 121 forms a substantially rectangular shape. The termination resistors Ra and Rb each may have a resistance value (for example, 50Ω) with which the received signal Vr is a substantial derivative signal of the input signal Vi.

As described above, in the present exemplary embodiment, it is possible to increase the amplitude of the received signal Vr, reduce communication errors caused by noise, and improve the communication quality, without shortening the distance between the coupler 111 and the coupler 121.

In the first exemplary embodiment, the configuration where the dielectric body 151 or 152 is provided with the perforated part 153 is described. In intra-device communication, in many cases, the couplers 111 and 121 are fixed to different members in the housing, and there is the air between the coupler 111 and the coupler 121. However, in inter-device communication, since the couplers 111 and 121 are implemented in housings of different products, between the couplers 111 and 121, the housings of the two products are interposed. In a second exemplary embodiment, a structure of housings between a coupler 111 and a coupler 121 will be described.

FIG. 8A is a perspective view of a structural example of dielectric bodies 151 and 152, conductors 111*a*, 111*b*, 121*a*, and 121*b*, and product housings 181 and 182 according to a comparative example. FIG. 8B is a plan view of the dielectric body 152 and the conductors 121*a* and 121*b* in FIG. 8A. The product housings 181 and 182 are made of a resin, for example. The conductors 111*a* and 111*b* are provided on the dielectric body 151 such as an FR4 circuit board. The dielectric body 151 is implemented on the product housing 181. The conductors 111*a* and 111*b* are sandwiched between the product housing 181 and the dielectric body 151. The conductor 121*a* and the conductor 121*b* are provided on the dielectric body 152 such as an FR4 circuit board. The dielectric body 152 is implemented on the product housing 182. The conductors 121*a* and 121*b* are sandwiched between the product housing 182 and the dielectric body 152.

FIG. 8C is a perspective view of a structural example of the dielectric bodies 151 and 152, the conductors 111*a*, 111*b*, 121*a*, and 121*b*, the product housings 181 and 182, and a perforated part 183 according to the second exemplary embodiment. FIG. 8D is a plan view of the dielectric body 152, the conductors 121*a* and 121*b*, the product housing 182, and the perforated part 183 in FIG. 8C. The product housings 181 and 182 are made of a resin, for example. The conductor 111*a* and the conductor 111*b* are provided on the dielectric body 151 such as an FR4 circuit board. The dielectric body 151 is implemented on the product housing 181. The conductors 111*a* and 111*b* are sandwiched between the product housing 181 and the dielectric body 151. The conductor 121*a* and the conductor 121*b* are provided on the dielectric body 152 such as an FR4 circuit board. The dielectric body 152 is implemented on the product housing 182. The conductors 121*a* and 121*b* are sandwiched between the product housing 182 and the dielectric body 152. In the product housing 182, the perforated part 183 is provided in a region that is projected onto a region between the conductors 121*a* and 121*b*. The perforated part 183 is a through hole of the product housing 182.

The coupling capacitance between the conductor 121*a* and the conductor 121*b* in FIGS. 8C and 8D is smaller than the coupling capacitance between the conductor 121*a* and the conductor 121*b* in FIGS. 8A and 8B. As described above, the amplitude of the received signal Vr in the case where the coupling capacitance in FIG. 4B is small is larger than the amplitude of the received signal Vr in the case where the coupling capacitance in FIG. 4A is large. Thus, the received signal Vr of the conductors 121*a* and 121*b* in FIGS. 8C and 8D is larger in amplitude than the received signal Vr of the conductors 121*a* and 121*b* in FIGS. 8A and 8B.

Figure 9A:
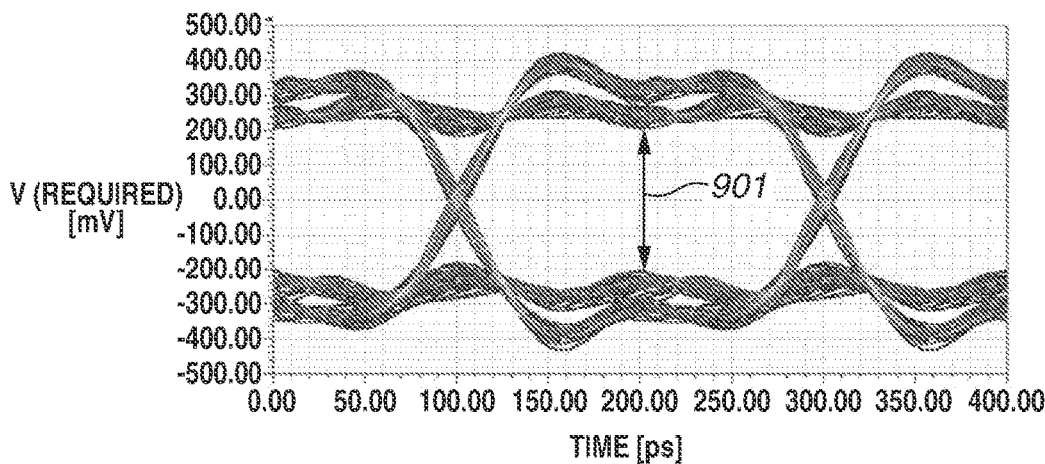
FIGS. 9A and 9B are diagrams illustrating simulation results of eye patterns of received signals, in accordance with one or more embodiment of the subject disclosure.

FIG. 9A is a diagram illustrating a simulation result of an eye pattern of the received signal Vr of the conductors 121*a* and 121*b* in FIGS. 8A and 8B. An amplitude value 901 of the received signal Vr is 406 mVpp.

Figure 9B:
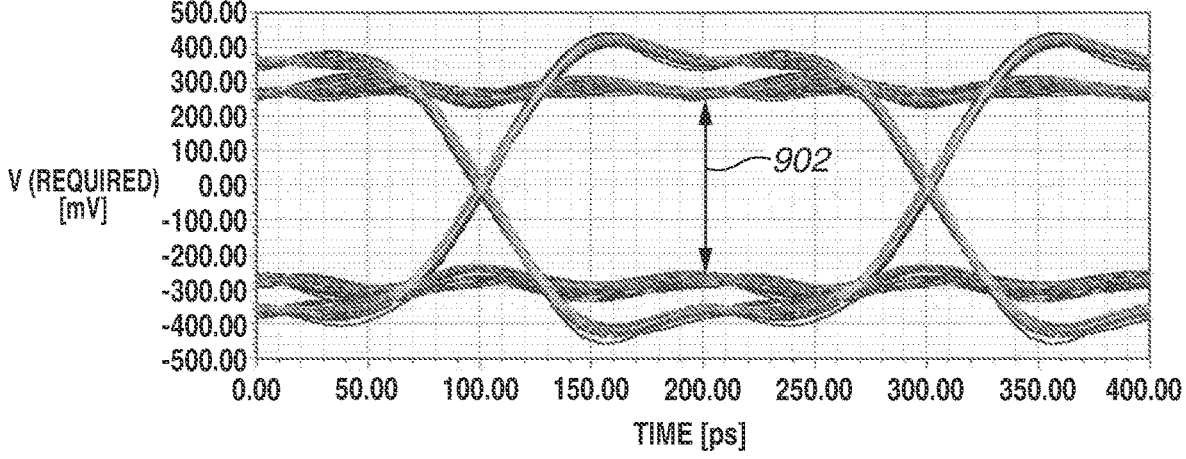

FIG. 9B is a diagram illustrating a simulation result of an eye pattern of the received signal Vr of the conductors 121*a* and 121*b* in FIGS. 8C and 8D. An amplitude value 902 of the received signal Vr is 493 mVpp.

It can be seen that the amplitude value 902 in FIG. 9B is about 1.21 times the amplitude value 901 in FIG. 9A. The input signal Vi is a signal of 5 Gbps and approximately 1 Vpp.

As described above, in the present exemplary embodiment, providing the perforated part 183 in the region of the product housing 182 that is projected onto the region between the conductor 121*a* and the conductor 121*b* makes it possible to reduce the coupling capacitance between the conductor 121*a* and the conductor 121*b*. Accordingly, the wireless communication system 100 can increase the amplitude of the received signal Vr and reduce communication errors caused by noise.

In the present exemplary embodiment, the couplers 111 and 121 are formed on the dielectric bodies 151 and 152 such as the circuit boards. However, the couplers 111 and 121 may not be formed on the dielectric bodies 151 and 152. For example, the couplers 111 and 121 may be conductors manufactured from conductive plates.

In the present exemplary embodiment, the length of the perforated part 183 is identical to the lengths of the long sides of the conductors 121*a* and 121*b*. However, the present disclosure is not limited to this. The length of the perforated part 183 may be shorter or longer than the lengths of the long sides of the conductors 121*a* and 121*b*.

In the present exemplary embodiment, the perforated part 183 is provided in the region of the product housing 182 that is projected onto the region between the conductors 121*a* and 121*b*. However, a recessed part may be provided instead of the perforated part 183. The thickness of the recessed part is smaller than the thickness of the product housing 182. More specifically, the thickness of the region of the product housing 182 that is projected onto the region between the conductor 121*a* and the conductor 121*b* is smaller than the thickness of the other region.

In the present exemplary embodiment, the perforated part 183 is provided in the region of the product housing 182 that is projected onto the region between the conductors 121*a* and 121*b*. However, the part provided in the region is not limited to the perforated part 183. Instead, a dielectric body with a lower relative dielectric constant than a relative dielectric constant of the product housing 182 may be provided in the region of the product housing 182 that is projected onto the region between the conductors 121*a* and 121*b*.

In the present exemplary embodiment, the coupling capacitance between the conductor 121*a* and the conductor 121*b* in the wireless communication module 120 is reduced. However, reducing the coupling capacitance between the conductor 111*a* and the conductor 111*b* in the wireless communication module 110 also has the effect of increasing the amplitude of the received signal Vr. Therefore, the perforated part 183 may be provided in the region of the product housing 181 that is projected onto the region between the conductor 111*a* and the conductor 111*b*.

As described above, the wireless communication module 110 includes the coupler 111, the dielectric body 151, and the product housing (exterior) 181. The coupler 111 includes the conductor 111*a* and the conductor 111*b* and is provided on the dielectric body 151. The dielectric body 151 is a circuit board, for example. The product housing 181 is a dielectric body (resin).

The wireless communication module 120 includes the coupler 121, the dielectric body 152, and the product housing 182. The coupler 121 includes the conductor 121*a* and the conductor 121*b*, is provided on the dielectric body 152. The coupler 121 is coupled to the coupler 111 by electric field coupling or magnetic field coupling. The dielectric body 152 is a circuit board, for example. The product housing 182 is a dielectric body (resin). The product housings 181 and 182 are provided between the coupler 111 and the coupler 121.

The product housing 182 is provided with a hole (the perforated part 183), a recessed part, or a dielectric body with a lower relative dielectric constant than the relative dielectric constant of the product housing 182, in at least a portion of the region that is projected onto the region between the conductor 121*a* and the conductor 121*b*.

In the above-described recessed part, the thickness of at least a portion of the region of the product housing 182 that is projected onto the region between the conductor 121*a* and the conductor 121*b* is smaller than the thickness of the region of the product housing 182 that is projected onto the region between the conductor 121*a* and the conductor 121*b*.

As described above, in the present exemplary embodiment, it is possible to increase the amplitude of the received signal Vr, reduce communication errors caused by noise, and improve the communication quality, without shortening the distance between the coupler 111 and the coupler 121.

In each of the first and second exemplary embodiments, the configuration is described where, in order to reduce the coupling capacitance between the conductors 121*a* and 121*b* or between the conductors 111*a* and 111*b*, the perforated part 153 or 183 is provided in the dielectric body 151 or 152 or in the product housing 181 or 182.

In a third exemplary embodiment, the distance between the conductors 121*a* and 121*b* is increased so that the coupling capacitance between conductors 121*a* and 121*b* is reduced and the amplitude of a received signal Vr is increased. In the case of a small-sized consumer device, an installation area for the coupler 121 is very small, and the distance between the conductors 121*a* and 121*b* is short. However, in the case of a large-scale production facility or factory machine, the installation area for the coupler 121 is sufficient, so that it is possible to increase the distance between the conductors 121*a* and 121*b*.

In FIGS. 5C and 5D, the distance between the conductors 111*a* and 111*b* is 1 mm, and the distance between the conductors 121*a* and 121*b* is 1 mm. FIG. 6B is the diagram illustrating the simulation result of the eye pattern of the received signal Vr of the conductors 121*a* and 121*b* in FIGS. 5C and 5D. As described above, the amplitude value 602 of the received signal Vr is 307 mVpp.

Figure 10A:
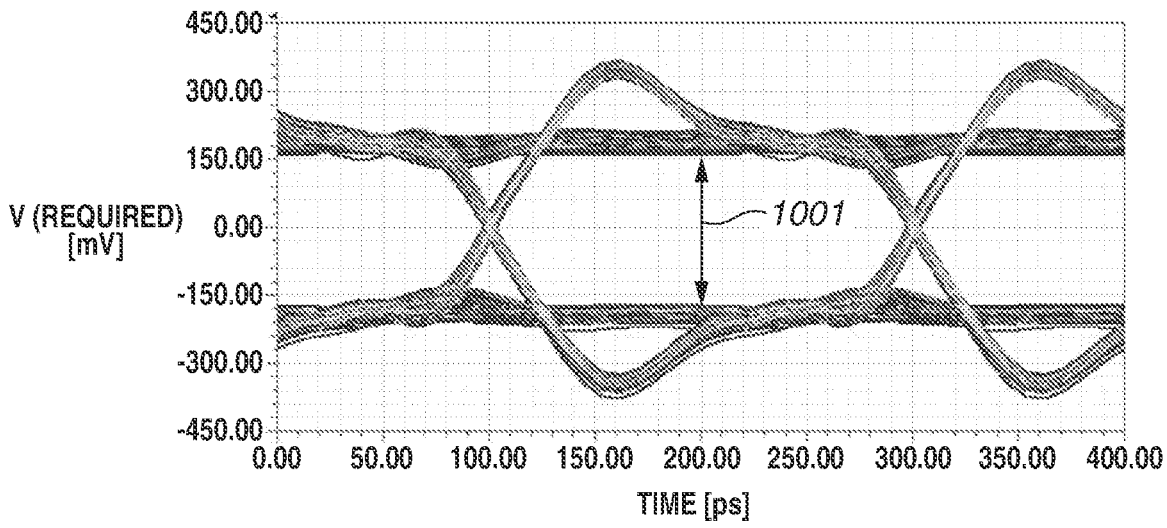
FIGS. 10A and 10B are diagrams illustrating simulation results of eye patterns of received signals, in accordance with one or more embodiment of the subject disclosure.

FIG. 10A is a diagram illustrating a simulation result of an eye pattern of the received signal Vr in a case where the distance between conductors 121*a* and 121*b* is 2 mm. The size of the perforated part 153 and the distance between the conductors 111*a* and 111*b* are the same as those illustrated in FIGS. 5C and 5D. An amplitude value 1001 of the opening in the eye pattern of the received signal Vr illustrated in FIG. 10A is 328 mVpp. It can be seen that the amplitude value 1001 in FIG. 10A is larger than the amplitude value 602 in FIG. 6B. Increasing the distance between the conductors 121*a* and 121*b* makes it possible to reduce the coupling capacitance between the conductors 121*a* and 121*b* and increase the amplitude value 1001 of the received signal Vr.

Figure 10B:
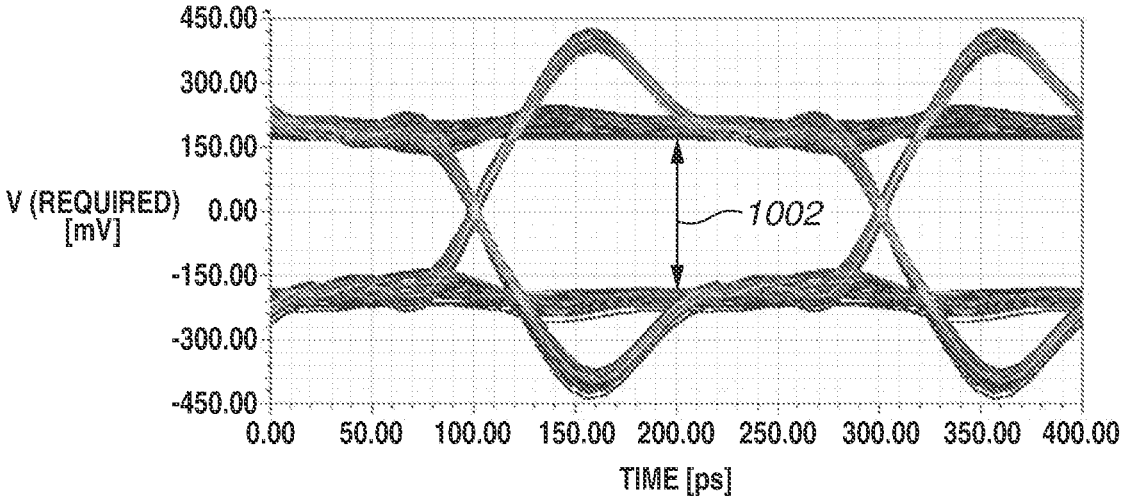

FIG. 10B is a diagram illustrating a simulation result of an eye pattern of the received signal Vr in a case where the distance between the conductors 121*a* and 121*b* is 2 mm and the distance between the conductors 111*a* and 111*b* is 2 mm. An amplitude value 1002 of the opening in the eye pattern of the received signal Vr illustrated in FIG. 10B is 351 mVpp. It can be seen that the amplitude value 1002 in FIG. 10B is larger than the amplitude value 1001 in FIG. 10A. Increasing the distance between the conductors 111*a* and

111*b* makes it possible to reduce the coupling capacitance between the conductors 111*a* and 111*b* and increase the amplitude value 1002 of the received signal Vr. Furthermore, since the distance between the conductors 111*a* and 111*b* and the distance between the conductors 121*a* and 121*b* are the same, an area in which the coupler 111 and the coupler 121 face each other increases, and the coupling capacitance between the coupler 111 and the coupler 121 becomes large. This makes it possible to increase the amplitude value 1002 of the received signal Vr.

As described above, in the present exemplary embodiment, the distance between the conductor 121*a* and the conductor 121*b* and/or the distance between the conductor 111*a* and the conductor 111*b* are increased. This makes it possible to reduce the coupling capacitance between the conductor 121*a* and the conductor 121*b* and/or the coupling capacitance between the conductor 111*a* and the conductor 111*b*. The wireless communication system 100 can increase the amplitude of the received signal Vr and reduce communication errors caused by noise.

As described above, in FIGS. 10A and 10B, the distance between the conductor 121*a* and the conductor 121*b* is 2 mm, and the length of the perforated part 153 is 1 mm. Instead of the perforated part 153, a recessed part, or a dielectric body with a lower relative dielectric constant than the relative dielectric constant of the dielectric body 152 may be provided. The distance between the conductor 121*a* and the conductor 121*b* is longer than the length of the perforated part 153, the recessed part, or the dielectric body with a lower relative dielectric constant than the relative dielectric constant of the dielectric body 152. Accordingly, the wireless communication system 100 can increase the amplitude of the received signal Vr and reduce communication errors caused by noise.

In the first to third exemplary embodiments, the results of simulation in which the termination resistors Ra and Rb are set to a high impedance (22 kΩ). However, setting the termination resistors Ra and Rb to approximately 50Ω also has the effect of increasing the amplitude of the received signal Vr.

In the first to third exemplary embodiments, the couplers 111 and 121 are formed on the dielectric bodies (circuit boards) 151 and 152. The material for the dielectric bodies (circuit boards) 151 and 152 is not limited to FR4 and may be Teflon® or polyimide.

In the first to third exemplary embodiments, the couplers 111 and 121 are formed on the dielectric bodies 151 and 152 such as circuit boards, but the present disclosure is not limited to this configuration. The couplers 111 and 121 may be manufactured by a Mechatronic Integrated Device (MID) method by which a special resin (dielectric body) is irradiated with laser to apply plating to only a portion irradiated with the laser. In other words, the couplers 111 and 121 may be manufactured by a method for applying metallic plating to a dielectric body (MID).

In the first to third exemplary embodiments, since the wireless communication system 100 transmits differential signals, the couplers 111 and 121 are desirably symmetrical in structure. More specifically, it is desirable that the conductor 111*a* and the conductor 111*b* be identical in shape, and the conductor 121*a* and the conductor 121*b* be identical in shape.

In the first to third exemplary embodiments, the conductors 111*a*, 111*b*, 121*a*, and 121*b* are formed in a rectangular shape. However, the conductors 111*a*, 111*b*, 121*a*, and 121*b* may partially have a circular hole, or may have an oval shape or a rhombus shape.

In the first to third exemplary embodiments, the wireless communication system 100 transmits differential signals. However, the present disclosure is not limited to this, and the wireless communication system 100 may transmit single signals.

In the first to third exemplary embodiments, a conductor may be arranged on the opposing surfaces of the conductors 111a and 111b so that the conductors 111a and 111b function as a transmission path with respect to the conductor. In this case, ends of the conductors 111a and 111b may be terminated with resistors that match the characteristic impedance of the transmission path.

In the first to third exemplary embodiments, the input signal Vi is a baseband signal. However, the input signal Vi may be a modulated signal.

The above-described exemplary embodiments are all mere specific examples for carrying out the present disclosure, and the technical scope of the present disclosure should not be interpreted in a limited way by these exemplary embodiments. In other words, the present disclosure can be carried out in various manners without deviating from the technical idea or principal features thereof.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-199346, filed Dec. 8, 2021, which is hereby incorporated by reference herein in its entirety.

What is claimed is:

1. A communication apparatus configured to transmit differential signals, comprising:

a dielectric body; and a second coupler provided on the dielectric body and configured to be coupled to a first coupler included in another communication apparatus by electric field coupling or magnetic field coupling, wherein the second coupler includes a first conductor and a second conductor, wherein the first conductor communicates one of the differential signals, wherein the second conductor communicates the other of the differential signals, and wherein the dielectric body is provided with a hole in at least a portion of a region that is projected onto a region between the first conductor and the second conductor.

2. The communication apparatus according to claim 1, wherein the dielectric body is a circuit board.

3. The communication apparatus according to claim 1, wherein the second coupler is a reception coupler.

4. The communication apparatus according to claim 3, further comprising a shaping circuit connected to the first conductor and the second conductor.

5. The communication apparatus according to claim 4, further comprising a termination resistor connected to an input terminal of the shaping circuit.

6. The communication apparatus according to claim 5, wherein the termination resistor has a resistance value with which a received signal of the second coupler becomes substantially rectangular in shape.

7. The communication apparatus according to claim 1, wherein the second coupler is a transmission coupler.

8. The communication apparatus according to claim 7, further comprising a transmission circuit configured to output a transmission signal to the second coupler.

9. The communication apparatus according to claim 1, wherein the second coupler is manufactured by a Mechatronic Integrated Device (MID) method in which metallic plating is applied to the dielectric body.

10. A communication apparatus configured to transmit differential signals, comprising:

a second coupler configured to be coupled to a first coupler included in another communication apparatus by electric field coupling or magnetic field coupling; and a dielectric body provided between the first coupler and the second coupler, wherein the second coupler includes a first conductor and a second conductor, wherein the first conductor communicates one of the differential signals, wherein the second conductor communicates the other of the differential signals, and wherein the dielectric body is provided with a hole in at least a portion of a region that is projected onto a region between the first conductor and the second conductor.

11. The communication apparatus according to claim 10, wherein the dielectric body is a housing.

12. A communication system comprising:

a first communication apparatus configured to transmit differential signals, and a second communication apparatus configured to transmit differential signals, wherein the first communication apparatus includes a first coupler, wherein the second communication apparatus includes:

a dielectric body; and a second coupler provided on the dielectric body and configured to be coupled to the first coupler by electric field coupling or magnetic field coupling, wherein the second coupler includes a first conductor and a second conductor, wherein the first conductor communicates one of the differential signals, wherein the second conductor communicates the other of the differential signals, wherein the dielectric body is provided with a hole in at least a portion of a region that is projected onto a region between the first conductor and the second conductor, and wherein the first conductor and the second conductor are flush with the dielectric body.

* * * * *